(12) United States Patent
Tolba et al.

(10) Patent No.: US 12,160,505 B2
(45) Date of Patent: Dec. 3, 2024

(54) METHODS, SYSTEMS, AND COMPUTER-READABLE STORAGE MEDIA FOR ORGANIZING AN ONLINE MEETING

(71) Applicant: HUAWEI TECHNOLOGIES CO., LTD., Guangdong (CN)

(72) Inventors: Mohamed Tolba, Kitchener (CA);
Ahmed Abdelkhalek, Kitchener (CA);
Teng Wu, Waterloo (CA)

(73) Assignee: HUAWEI TECHNOLOGIES CO. LTD., Guangdong (CN)

( * ) Notice: Subject to any disclaimer, the term of this patent is extended or adjusted under 35 U.S.C. 154(b) by 332 days.

(21) Appl. No.: 17/558,299

(22) Filed: Dec. 21, 2021

(65) Prior Publication Data
US 2023/0198749 A1   Jun. 22, 2023

(51) Int. Cl.
*H04L 9/08* (2006.01)
*H04L 12/18* (2006.01)

(52) U.S. Cl.
CPC ........ *H04L 9/0836* (2013.01); *H04L 12/1822* (2013.01)

(58) Field of Classification Search
None
See application file for complete search history.

(56) References Cited

U.S. PATENT DOCUMENTS 7,088,822 B2 *   8/2006   Asano .............. G11B 20/00253
380/278

2002/0146127 A1 *   10/2002   Wong .................... H04W 12/04
380/270
2006/0004715 A1 *   1/2006   Lock ..................... G06F 16/284
(Continued)

FOREIGN PATENT DOCUMENTS

| CN | 101155027 A | 4/2008 |
|---|---|---|
| CN | 101309137 A | 11/2008 |
| CN | 112422282 A | 2/2021 |

OTHER PUBLICATIONS

Matthew A. Weidner, "Group Messaging for Secure Asynchronous Collaboration", Jun. 6, 2019, pp. 1-89 (Year: 2019).*
(Continued)

*Primary Examiner* — Trang T Doan
(74) *Attorney, Agent, or Firm* — Locke Lord LLP; Tim Tingkang Xia, Esq.

(57) ABSTRACT

A method of organizing an end-to-end encrypted online meeting for a group of members including a creator. The method includes: maintaining, by each member in the online meeting including the creator, a group tree from which is derivable a group key required for communication between members in the online meeting; accessing, by the creator, a key package associated with a member of the group; adding to the online meeting, by the creator and based on the key package, the member associated with the key package; updating, by the creator, the group tree maintained by the creator; generating, by the creator and based on the updated group tree, one or more encrypted secret keys required for deriving the group key; and transmitting, by the creator and via a server, the updated group tree and the one or more encrypted secret keys to each other member in the online meeting.

22 Claims, 9 Drawing Sheets

(56) References Cited

U.S. PATENT DOCUMENTS

| | | | | |
|---|---|---|---|---|
| 2009/0307759 | A1* | 12/2009 | Schnell | G06F 21/1012 |
| | | | | 726/4 |
| 2011/0249817 | A1 | 10/2011 | Park et al. | |
| 2017/0180122 | A1* | 6/2017 | Smith | H04L 9/0822 |
| 2018/0097638 | A1* | 4/2018 | Haldenby | H04W 12/0433 |
| 2018/0097783 | A1* | 4/2018 | Haldenby | H04L 63/0442 |
| 2022/0138182 | A1* | 5/2022 | Yang | G06F 16/245 |
| | | | | 707/703 |
| 2022/0294613 | A1* | 9/2022 | Fischer | H04L 9/006 |
| 2022/0360589 | A1* | 11/2022 | Muscariello | H04L 9/0836 |
| 2023/0108261 | A1* | 4/2023 | Elkins | H04L 63/18 |
| | | | | 713/171 |

OTHER PUBLICATIONS

Matthew A. Weidner, Group Messaging for Secure Asynchronous Collaborationâ, Jun. 6, 2019, pp. 1-89 (Year: 2019) (Year: 2019).*
PCT International Search Report in Respect of International Application PCT/CN2022/132799, Feb. 10, 2023.

* cited by examiner

METHODS, SYSTEMS, AND COMPUTER-READABLE STORAGE MEDIA FOR ORGANIZING AN ONLINE MEETING

FIELD OF THE DISCLOSURE

The present disclosure relates to methods, systems, and computer-readable media for organizing an online meeting, such as a teleconference.

BACKGROUND TO THE DISCLOSURE

End-to-End Encryption (E2EE) is a security measure being increasingly adopted to ensure that confidential information is only accessible to the communicating parties and not to any intermediate nodes. While key material establishment can provide such protection, it is challenging to implement, especially in dynamic group settings. Two common approaches for facilitating key material establishment in a group setting are pairwise key agreement and sender keys. However, both have their limitations that include poor scalability as the group size increases as well as the failure to achieve state-of-the-art security properties such as Forward Secrecy (FS) and Post-Compromise Security (PCS). With FS and PCS, both prior and future communications within the group are protected, irrespective of when the communication channel is compromised.

SUMMARY

According to one aspect of this disclosure, there is provided a method of organizing an end-to-end encrypted online meeting for a group of members including a creator. The method comprises: maintaining, by each member in the online meeting including the creator, a group tree from which is derivable a group key required for communication between members in the online meeting; accessing, by the creator, a key package associated with a member of the group; adding to the online meeting, by the creator and based on the key package, the member associated with the key package; updating, by the creator, the group tree maintained by the creator; generating, by the creator and based on the updated group tree, one or more encrypted secret keys required for deriving the group key; and transmitting, by the creator and via a server, the updated group tree and the one or more encrypted secret keys to each other member in the online meeting.

In some embodiments, the group tree comprises: a number of leaf nodes, each leaf node corresponding to a member of the group that has joined the online meeting; and a number of logical nodes including a root node, each logical node being connected to one or more of: at least one leaf node; and at least one other logical node.

In some embodiments, said updating the group tree comprises: adding a leaf node to the group tree, wherein the leaf node corresponds to the member of the group associated with the key package; and adding a logical node to the group tree.

In some embodiments, said generating the one or more encrypted secret keys comprises: randomly generating a secret key at the added logical node; for each logical node on a direct path extending from the added logical node to the root node, except for the added logical node: deriving a secret key based on the secret key stored at a child node of the logical node; and encrypting the derived secret key using a public key stored at another child node of the logical node.

In some embodiments, said accessing the key package comprises: receiving, by the creator, a JOIN request associated with member of the group wishing to join the online meeting; and extracting, by the creator, the key package from the JOIN request.

In some embodiments, the method further comprises: prior to the creator joining the online meeting, requesting, by the creator and from the server, a key package associated with each other member of the group; and receiving each requested key package.

In some embodiments, the group of members further includes a convener, and the method further comprises: receiving, by the server and from the convener, a request to join the online meeting; permitting, by the server and based on the request, the convener to join the online meeting; and assigning, by the server, a creator role to the convener.

In some embodiments, the creator is a first-joined member of the group of members that have joined the online meeting before other members of the group of members.

In some embodiments, the method further comprises: receiving, by the server, a JOIN request from a member of the group wishing to join the online meeting; transmitting, by the server, the JOIN request to the creator; determining, by the server, that no response to the JOIN request has been received within a predetermined amount of time; in response to determining that no response to the JOIN request has been received within the predetermined amount of time: selecting, by the server, another member of the group that has joined the online meeting; and transmitting the JOIN request to the selected member of the group.

In some embodiments, the method further comprises: receiving, by the server and from a member of the group that had previously joined the online meeting and that is currently not in the online meeting, a request to rejoin the online meeting; and determining, by the server and based on the request to rejoin the online meeting, whether to provide the member requesting to rejoin the online meeting with any updates to the group tree and any encrypted secret keys generated while the member requesting to rejoin the online meeting was not in the online meeting.

In some embodiments, said determining whether to provide the member requesting to rejoin the online meeting with any updates to the group tree and any encrypted secret keys comprises: determining an epoch associated with the request to rejoin the online meeting; and determining, based on the epoch, whether to provide the member requesting to rejoin the online meeting with any updates to the group tree and any encrypted secret keys.

In some embodiments, said determining whether to provide the member requesting to rejoin the online meeting with any updates to the group tree and any encrypted secret keys comprises: determining that the epoch associated with the request to rejoin the online meeting does not correspond to a current epoch of the online meeting; and in response thereto, providing the member requesting to rejoin the online meeting with any updates to the group tree and any encrypted secret keys generated while the member requesting to rejoin the online meeting was not in the online meeting.

In some embodiments, said providing the member requesting to rejoin the online meeting with any updates to the group tree and any encrypted secret keys comprises: transmitting, by the server, the request to rejoin the online meeting to the creator; after transmitting the request to rejoin the online meeting, receiving by the server and from the creator, the group key, wherein the group key is encrypted; and transmitting, by the server and to the member requesting to rejoin the online meeting, the encrypted group key, any updates to the group tree, and any encrypted secret keys generated while the member requesting to rejoin the online meeting was not in the online meeting.

In some embodiments, the group key is encrypted using a public key stored at a leaf node of the group tree corresponding to the member requesting to rejoin the online meeting.

In some embodiments, said determining whether to provide the member requesting to rejoin the online meeting with any updates to the group tree and any encrypted secret keys comprises: determining that the epoch associated with the request to rejoin the online meeting corresponds to a current epoch of the online meeting; and in response thereto, notifying, by the server, the member requesting to rejoin the online meeting that the member requesting to rejoin the online meeting may use their current group key to communicate with other members in the online meeting.

In some embodiments, the method further comprises: incrementing, by the server, a counter for each update to the group tree maintained by the creator; comparing, by the server, the counter to a threshold; and based on the comparison, determining, by the server, whether to notify members in the online meeting to use the current group key to communicate with other members in the online meeting.

In some embodiments, said incrementing the counter comprises: after transmitting the updated group tree and the one or more encrypted secret keys to each other member in the online meeting, determining, by the server, that each other member in the online meeting has acknowledged receipt of the updated group tree and the one or more encrypted secret keys; and in response thereto, incrementing the counter.

In some embodiments, the method further comprises: transmitting the group key to each member of the group that has joined the online meeting since the group key was last switched, wherein the transmitted group key is encrypted.

In some embodiments, the group key is encrypted using a public key stored at a leaf node of the group tree corresponding to the member of the group that has joined the online meeting since the group key was last switched.

In some embodiments, the method further comprises: after all members of the group have joined the online meeting, receiving a further updated group tree; transmitting the further updated group tree to each member in the online meeting; determining that each member in the online meeting has acknowledged receipt of the further updated group tree; and in response thereto, notifying members in the online meeting to use the current group key to communicate with other members in the online meeting.

In some embodiments, the online meeting is a teleconference.

In some embodiments, the online meeting operates according to the Messaging Layer Security (MLS) protocol.

According to one aspect of this disclosure, there is provided a non-transitory computer-readable medium having stored thereon computer program code configured, when executed by one or more processors, to cause the one or more processors to perform a method of organizing an end-to-end encrypted online meeting for a group of members including a creator, comprising: maintaining, by each member in the online meeting, including the creator, a group tree from which is derivable a group key required for communication between members in the online meeting; accessing, by the creator, a key package associated with a member of the group; adding to the online meeting, by the creator and based on the key package, the member associated with the key package; updating, by the creator, the group tree maintained by the creator; generating, by the creator and based on the updated group tree, one or more encrypted secret keys required for deriving the group key; and transmitting, by the creator and via a server, the updated group tree and the one or more encrypted secret keys to each other member in the online meeting.

According to one aspect of this disclosure, there is provided a processor for executing instructions to perform actions for organizing an end-to-end encrypted online meeting for a group of members including a creator, the actions comprising: maintaining, by each member in the online meeting, including the creator, a group tree from which is derivable a group key required for communication between members in the online meeting; accessing, by the creator, a key package associated with a member of the group; adding to the online meeting, by the creator and based on the key package, the member associated with the key package; updating, by the creator, the group tree maintained by the creator; generating, by the creator and based on the updated group tree, one or more encrypted secret keys required for deriving the group key; and transmitting, by the creator and via a server, the updated group tree and the one or more encrypted secret keys to each other member in the online meeting.

Compared to conventional teleconference technologies, the methods, systems, and computer-readable media disclosed herein supports the use of the MLS protocol in teleconference applications.

The methods, systems, and computer-readable media disclosed herein build a group tree for an online meeting wherein the group tree is built gradually by adding one or more members in each step by the meeting creator/convener. In addition, convener updates on behalf of new member(s) and sends secrets to others including the new member(s), thereby preventing the joined member(s) from updating their paths at the join time (to fill the intermediate nodes of the group tree and hence achieve the efficiency for later operations). Thus, by using the methods, systems, and computer-readable media disclosed herein, members may join the online meeting at the same time without overwhelming the network and affecting the performance. Moreover, communication can start very early. Then, others can join gradually.

In various embodiments the methods, systems, and computer-readable media disclosed herein allow members who was dropped off from the online meeting to immediately again participate in the online meeting after rejoining the meeting. By using the methods, systems, and computer-readable media disclosed herein, a key switch during group operations would not interrupt members that did not receive the current key from participate in the online meeting.

This summary does not necessarily describe the entire scope of all aspects. Other aspects, features, and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which.

DETAILED DESCRIPTION

Embodiments disclosed herein relate to methods, systems, and computer-readable media for organizing an online meeting such as a teleconference using computing devices in a computer network system. While various embodiments of the disclosure are described below, the disclosure is not limited to these embodiments, and variations of these embodiments may well fall within the scope of the disclosure which is to be limited only by the appended claims.

The Messaging Layer Security (MLS) protocol has been developed to implement End-to-end encryption (E2EE) (see, for example, https://messaginglayersecurity.rocks/mls-protocol/draft-ietf-mls-protocol.html, the content of which is incorporated herein by reference in its entirety). MLS uses TreeKEM (Karthikeyan Bhargavan, Richard Barnes, and Eric Rescorla, *TreeKEM: Asynchronous Decentralized Key Management for Large Dynamic Groups. A protocol proposal for Messaging Layer Security* (*MLS*); https://hal.inria.fr/hal-02425247) which is a protocol for organizing the members of a group in the form of a group tree. Within the group tree, a sequence of secrets known only to the members of the group can be derived. These secrets are used to derive a sequence of public and private key pairs. The secret keys (and hence, the public and private key pairs) are updated periodically and in response to any change in the group membership, for example, after a member of the group is added to or removed from the messaging group. As a result, MLS is able to achieve forward secrecy and post-compromise security.

Figure 4:
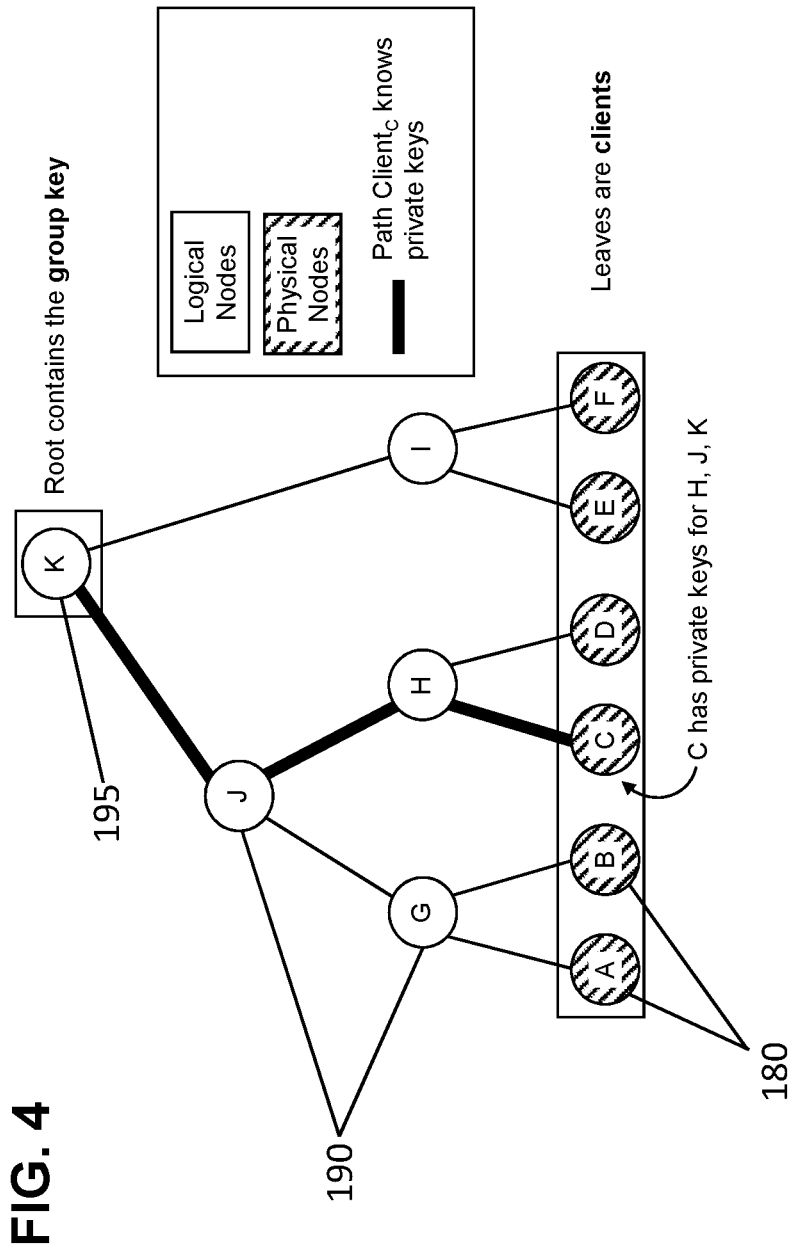
FIG. 4 shows a group tree comprising physical leaf nodes interconnected by logical nodes, according to an embodiment of the disclosure.

For example, as can be seen from FIG. 4, the group members (for example, a client computing device) are represented by leaf nodes 180 of the group tree (A, B, C, D, E, F), while a number of interconnected logical nodes 190 (G, H, I, J, K) are used to efficiently propagate updates to the secret keys (and hence, updates to the public and private key pairs) as the group tree is expanded to accommodate the addition of new members. More particularly, each non-leaf node is connected to one parent node and has two child nodes (i.e. the group tree may be a binary tree). Logical nodes 190 include a root node 195 storing a secret key required to derive a group key. The group key is required for members in the online meeting to communicate with one another. As explained in further detail below, each member is able to derive the secret keys stored at logical nodes 190 along a direct path extending from their leaf node 180 to root node 195. For example, client C is able to derive the secret key stored at node H from a randomly generated secret at node C, which in turn allows the derivation of the secret key stored at node J, which in turn allows the derivation of the secret key stored at node K, and which in turn allows the derivation of the group key. For each node along the direct path, a public and private key is derivable from its generated or derived secret key.

The use of such a group tree allows for updates to the secret keys (that will be used to generate a new group key) to be efficiently propagated, and hence is suitable for large groups of tens of thousands of group members. Moreover, the MLS protocol is defined such that it is not required for all group members to be online in order for a consensus to be reached on the group key. However, while MLS was designed to support messaging applications, it suffers from a number of drawbacks when used to support, for example, teleconference applications in which all of the members are online at the same time and attempt to join the meeting at the same time.

Figure 5:
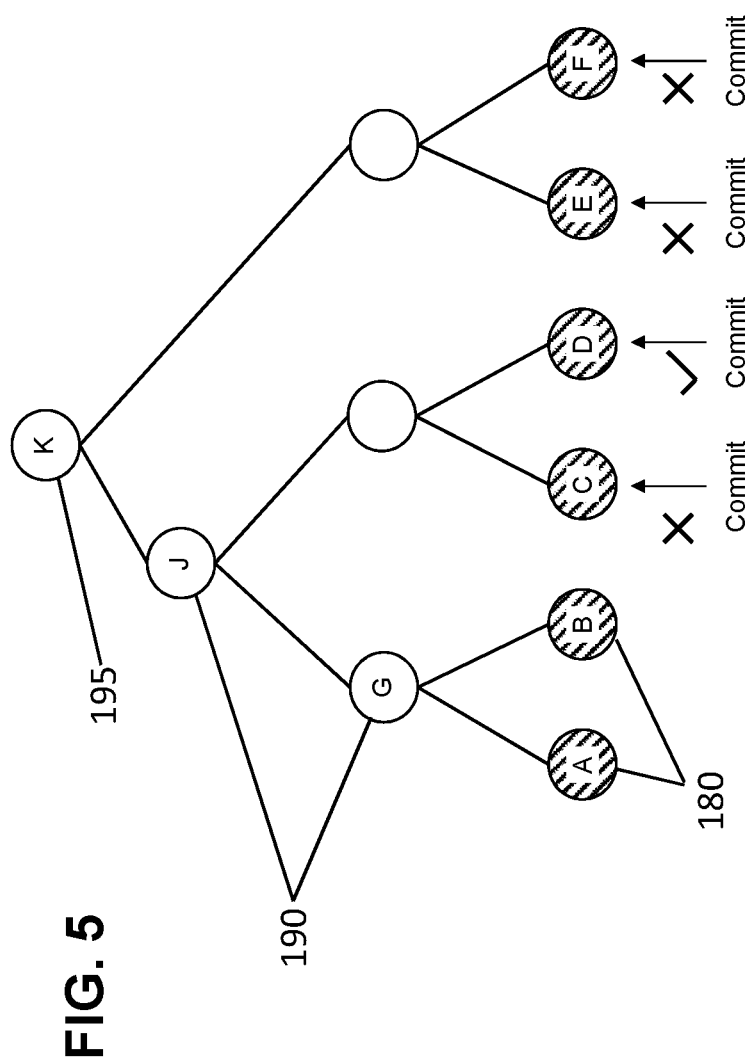
FIG. 5 shows a group tree comprising physical leaf nodes interconnected by logical nodes, with commit messages being simultaneously transmitted by some of the physical nodes.

For example, referring now to FIG. 5, MLS defines the following proposals:

1. Add-Proposal: A structure that contains the key package of a new member to be added. Any existing member of the group can prepare this proposal and send the proposal to other members. All members, including the member sending the proposal, will cache the proposal, and the addition of the new member will not take effect unless a commit of this proposal is issued by one of the existing members. The existing member that commits the add-proposal adds a leaf node to the group tree using the key package in the add-proposal, and updates its own path in the group tree. Subsequently, the secrets stored at any nodes on the updated path are encrypted and sent to all other members. In addition, the member that commits the add-proposal prepares a welcome message for the new member, containing the group tree with all public keys, and encrypts the secret keys (required to deriving the group key) using the public key included in key package of the new member.

2. Remove-Proposal: A structure that contains the identity of the removed member. Any existing member can prepare this proposal to remove another existing member from the group. This proposal will not take an effect unless a commit message is prepared for this proposal.

3. Update-Proposal: A structure that contains a key package. This proposal is issued by a member who wants to update the key package thereof in the group tree. This proposal will not take effect unless a commit message is prepared for this proposal.

MLS defines two types of commits:

1. Commits that apply many proposals (add, remove, and updates). After the application of these proposals, the committer updates the path thereof.

2. Commits without proposals. The committer only updates the path thereof with no proposal.

In order to create a group in MLS, the creator prepare n add-proposals for the group members and a commit message for these n proposals. After the creation of the group, only the creator's path, that is, the logical nodes on the path, will have secrets and hence the public/private key pairs. Other logical nodes will be empty. Therefore, any subsequent group operations will require O(n) encryptions. In order to exploit the tree structure and have O(log(n)) encryptions, the intermediate logical nodes need to be filled. This can be done when the members update their paths. Therefore, after joining, each member will update their path by sending a commit message (with no proposal).

However, MLS does not accept concurrent commits. Therefore, only one commit will be accepted and all others will be rejected. Therefore, the rejected commits will need to be prepared again (after applying the accepted one) and sent again.

On the other hand, in a teleconference, all group members are online at approximately the same time and, according to MLS, will therefore simultaneously prepare commit messages (with no proposals) and send the commit messages to other members for the purpose of updating the committer's path and filling the intermediate logical nodes. Concurrent commit operations are not allowed in MLS, and therefore only one commit message will be accepted while the others will be rejected, as can be seen in FIG. 5 (only node D's commit message has been accepted). In a group comprising 5,000 members, for example, the commit message of only one member will be accepted while the commit messages of all other members (4,998 members (excluding the group creator)) will be rejected. The rejected commit messages will therefore need to be resent until they are accepted. Consequently, the communication network will be overwhelmed, and the performance of later operations will be affected.

Additionally, in MLS, if a member is temporarily disconnected from the online meeting (for example, the member goes offline), the offline member will no longer be apprised of updates to group tree and therefore will be unable to derive the group key upon rejoining the meeting. Upon rejoining the meeting, the member will be required to fetch the group operations that were performed while the member was offline, in order to generate the most up-to-date version of the group tree. While this may be acceptable for group messaging applications, it is generally not acceptable for teleconference applications since the rejoining member will be unable to immediately participate in the conference.

Further still, in MLS, after each update to the group key, the latest group key is required in order to communicate with other members in the online meeting. In certain applications, this may pose problems if, for example, one or more members have not yet updated their versions of the group tree and therefore are as yet unable to derive the latest group key.

As will be described in further detail below, embodiments of the disclosure address these shortcomings in MLS so as to enable the adoption of MLS across a wider range of applications, for example teleconference applications.

Figure 1:
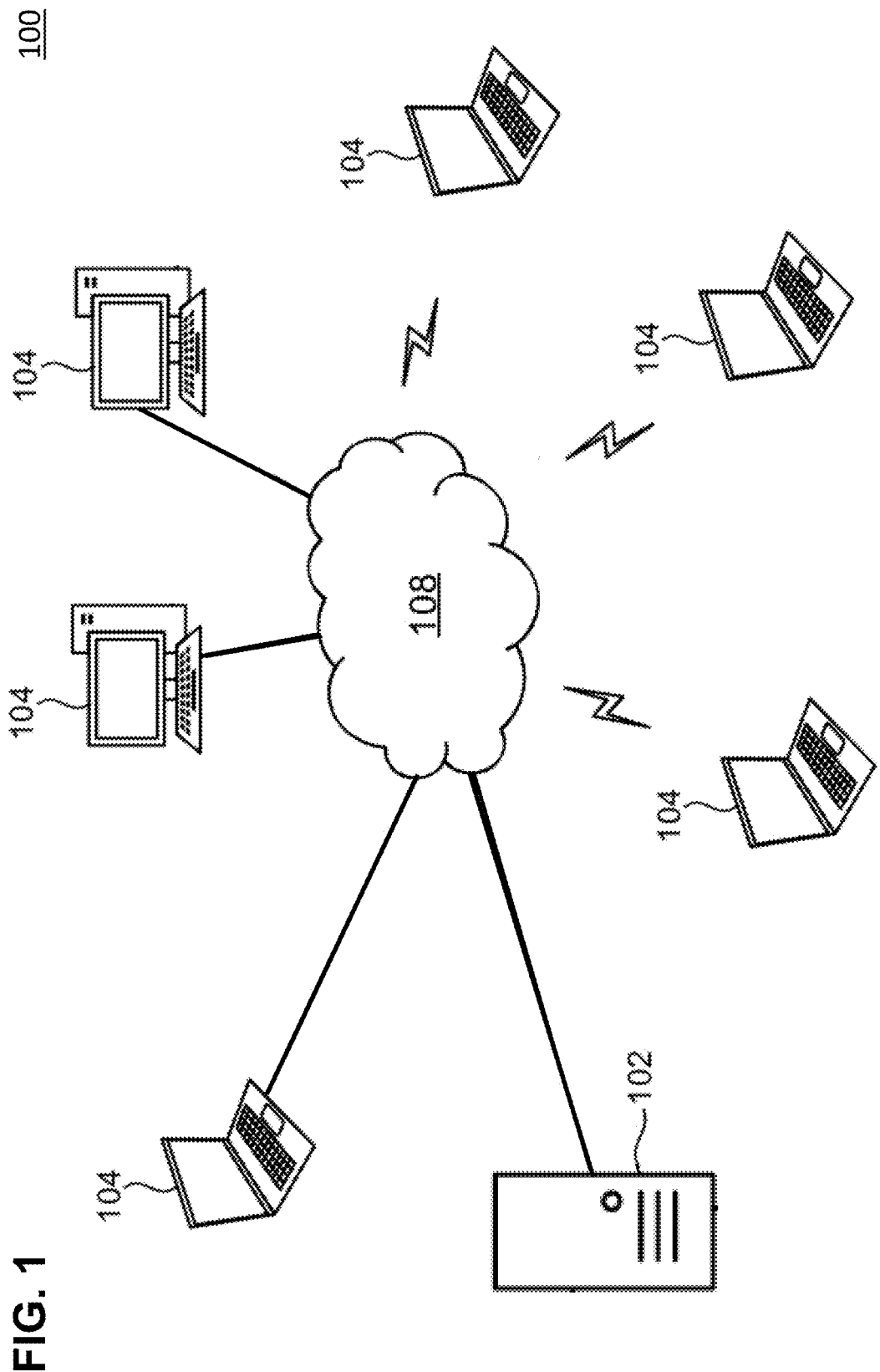
FIG. 1 is a schematic diagram of a system comprising a network of client computing devices and a server, according to an embodiment of the disclosure.

Turning now to FIG. 1, there is shown an embodiment of a computer network system 100 for implementing an online meeting such as a teleconference. As shown, system 100 comprises at least one server computer 102 (also simply denoted at least one "server") and a plurality of client computing devices 104 functionally interconnected by a network 108, such as the Internet, a local area network (LAN), a wide area network (WAN), a metropolitan area network (MAN), and/or the like, via suitable wired and wireless networking connections. As those skilled in the art will appreciate, system 100 in some embodiments may be a local network system within a company, an organization, and/or the like and used by a limited number of users thereof. In some other embodiments, system 100 may leverage the Internet and may be a cloud-computing system. Such a cloud-computing system may comprise interconnected hardware and software resources that are accessible by users, where data and data products may be stored, trained, shared, and queried for usage Server 102 may be a computing device designed specifically for use as a server, and/or general-purpose computing device acting as a server computer while also being used by various users. Server 102 may execute one or more server programs.

Client computing devices 104 may be portable and/or non-portable computing devices such as laptop computers, tablets, smartphones, Personal Digital Assistants (PDAs), desktop computers, and/or the like. Each client computing device 104 may execute one or more client application programs which sometimes may be called "apps".

Figure 2:
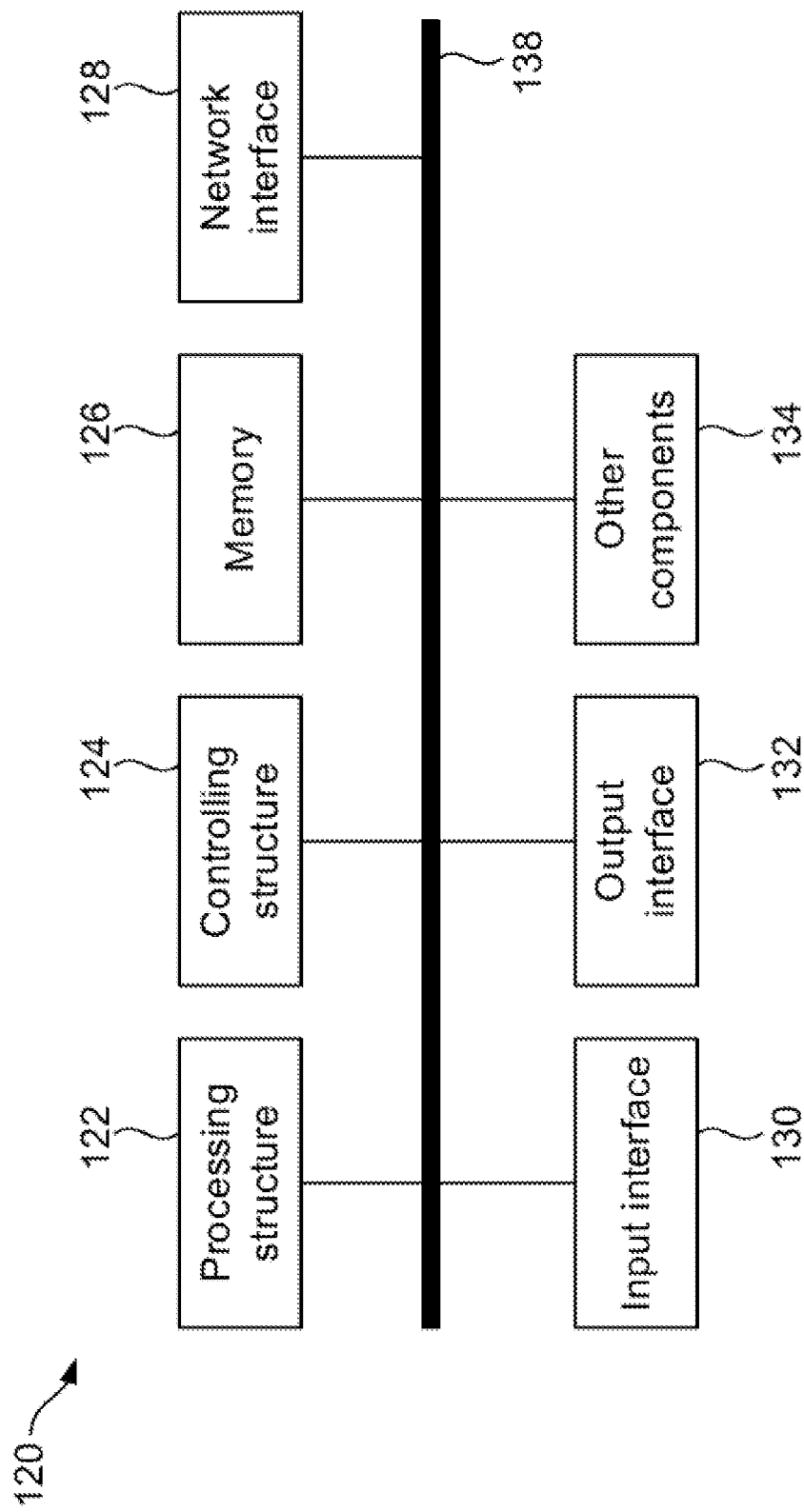
FIG. 2 is a schematic diagram showing a simplified hardware structure of a computing device of the system shown in FIG. 1, according to an embodiment of the disclosure.

Generally, server 102 and client computing devices 104 comprise similar hardware structures such as the hardware structure 120 shown in FIG. 2. As shown, hardware structure 120 comprises a processing structure 122, a controlling structure 124, one or more non-transitory computer-readable memory or storage devices 126, a network interface 128, an input interface 130, and an output interface 132, functionally interconnected by a system bus 138. Hardware structure 120 may also comprise other components 134 coupled to system bus 138.

Processing structure 122 may be one or more single-core or multiple-core computing processors, generally referred to as central processing units (CPUs), such as INTEL® microprocessors (INTEL is a registered trademark of Intel Corp., Santa Clara, CA, USA), AMD® microprocessors (AMD is a registered trademark of Advanced Micro Devices Inc., Sunnyvale, CA, USA), ARM® microprocessors (ARM is a registered trademark of Arm Ltd., Cambridge, UK) manufactured by a variety of manufactures such as Qualcomm of San Diego, California, USA, under the ARM® architecture, or the like. When processing structure 122 comprises a plurality of processors, the processors thereof may collaborate via a specialized circuit such as a specialized bus or via system bus 138.

Processing structure 122 may also comprise one or more real-time processors, programmable logic controllers (PLCs), microcontroller units (MCUs), μ-controllers (UCs), specialized/customized processors, hardware accelerators, and/or controlling circuits (also denoted "controllers") using, for example, field-programmable gate array (FPGA) or application-specific integrated circuit (ASIC) technologies, and/or the like. In some embodiments, the processing structure includes a CPU (otherwise referred to as a host processor) and a specialized hardware accelerator which includes circuitry configured to perform specific computations such as computations of neural networks (for example, tensor multiplication, matrix multiplication, and the like). The host processor may offload computations to the hardware accelerator to perform computation operations. Examples of a hardware accelerator include a graphics processing unit (GPU), Neural Processing Unit (NPU), and Tensor Process Unit (TPU).

Generally, each processor of processing structure 122 comprises necessary circuitries implemented using technologies such as electrical and/or optical hardware components for executing one or more processes as the implementation purpose and/or the use case maybe, to perform various tasks. For example, each processor of processing structure 122 may comprise logic gates implemented by semiconductors to perform various computations, calculations, operations, and/or processes. Examples of logic gates include AND gates, OR gates, XOR (exclusive OR) gates, and NOT gates, each of which takes one or more inputs and generates or otherwise produces an output therefrom based on the logic implemented therein. For example, a NOT gate receives an input (for example, a high voltage, a state with electrical current, a state with an emitted light, or the like), inverts the input (for example, forming a low voltage, a state with no electrical current, a state with no light, or the like), and outputs the inverted input as the output.

While the inputs and outputs of the logic gates are generally physical signals and the logics or processes thereof are tangible operations with physical results (for example, outputs of physical signals), the inputs and outputs thereof are generally described using numerals (for example, numerals "0" and "1") and the operations thereof are generally described as "computing" (which is how the "computer" or "computing device" is named) or "calculation" or more generally, "processing", for generating or producing the outputs from the inputs thereof.

Sophisticated combinations of logic gates in the form of a circuitry of logic gates, such as the one or more processors of processing structure 122, may be formed using a plurality of AND, OR, XOR, and/or NOT gates. Such combinations of logic gates may be implemented using individual semiconductors, or more often be implemented as integrated circuits (ICs). A circuitry of logic gates may be "hard-wired" circuitry which, once designed, may only perform the designed tasks. In other words, the tasks thereof are "hard-coded" in the circuitry.

With the advance of technologies, it is often the case that a circuitry of logic gates, such as the one or more processors of processing structure 122, may be alternatively designed in a general manner so that it may perform various tasks according to a set of "programmed" instructions implemented as firmware and/or software and stored in one or more non-transitory computer-readable storage devices or media. Thus, the circuitry of logic gates, such as the one or more processors of processing structure 122, is usually of no use without meaningful firmware and/or software.

Of course, those skilled the art will appreciate that a processor may be implemented using other technologies such as analog technologies.

Controlling structure 124 comprises one or more controlling circuits, such as graphic controllers, input/output chipsets, and the like, for coordinating operations of various hardware components and modules of server 102 and/or computing devices 104.

Memory 126 comprises one or more storage devices or media accessible by processing structure 122 and controlling structure 124 for reading and/or storing instructions for processing structure 122 to execute, and for reading and/or storing data, including input data and data generated by processing structure 122 and controlling structure 124. Memory 126 may be volatile and/or non-volatile, non-removable or removable memory such as RAM, ROM, EEPROM, solid-state memory, hard disks, CD, DVD, flash memory, or the like. In use, memory 126 is generally divided into a plurality of portions for different use purposes. For example, a portion of memory 126 (denoted as storage memory herein) may be used for long-term data storing, for example, for storing files or databases. Another portion of memory 126 may be used as the system memory for storing data during processing (denoted as working memory herein).

Network interface 128 comprises one or more network modules for connecting to other computing devices or networks through network 108 by using suitable wired or wireless communication technologies such as Ethernet, WI-FI® (WI-FI is a registered trademark of Wi-Fi Alliance, Austin, TX, USA), BLUETOOTH® (BLUETOOTH is a registered trademark of Bluetooth Sig Inc., Kirkland, WA, USA), Bluetooth Low Energy (BLE), Z-Wave, Long Range (LoRa), ZIGBEE® (ZIGBEE is a registered trademark of ZigBee Alliance Corp., San Ramon, CA, USA), wireless broadband communication technologies such as Global System for Mobile Communications (GSM), Code Division Multiple Access (CDMA), Universal Mobile Telecommunications System (UMTS), Worldwide Interoperability for Microwave Access (WiMAX), CDMA2000, Long Term Evolution (LTE), 3GPP, 5G New Radio (5G NR) and/or other 5G networks, and/or the like. In some embodiments, parallel ports, serial ports, USB connections, optical connections, or the like may also be used for connecting other computing devices or networks although they are usually considered as input/output interfaces for connecting input/output devices.

Input interface 130 comprises one or more input modules for one or more users to input data via, for example, touch-sensitive screen, touch-sensitive whiteboard, touch-pad, keyboards, computer mouse, trackball, microphone, scanners, cameras, and/or the like. Input interface 130 may be a physically integrated part of server 102 and/or computing devices 104 (for example, the touch-pad of a laptop computer or the touch-sensitive screen of a tablet), or may be a device physically separated from, but functionally coupled to, other components of server 102 and/or computing devices 104 (for example, a computer mouse). Input interface 130, in some implementation, may be integrated with a display output to form a touch-sensitive screen or touch-sensitive whiteboard.

Output interface 132 comprises one or more output modules for output data to a user. Examples of the output modules include displays (such as monitors, LCD displays, LED displays, projectors, and the like), speakers, printers, virtual reality (VR) headsets, augmented reality (AR) goggles, and/or the like. Output interface 132 may be a physically integrated part of the server 102 and/or computing devices 104 (for example, the display of a laptop computer or a tablet), or may be a device physically separate from but functionally coupled to other components of server 102 and/or computing devices 104 (for example, the monitor of a desktop computer).

System bus 138 interconnects various components 122 to 134 enabling them to transmit and receive data and control signals to and from each other.

From the computer point of view, server 102 and/or computing devices 104 may comprise a plurality of modules. Herein, a "module" is a term of explanation referring to a hardware structure such as a circuitry implemented using technologies such as electrical and/or optical technologies (and with more specific examples of semiconductors) for performing defined operations or processes. A "module" may alternatively refer to the combination of a hardware structure and a software structure, wherein the hardware structure may be implemented using technologies such as electrical and/or optical technologies (and with more specific examples of semiconductors) in a general manner for performing defined operations or processes according to the software structure in the form of a set of instructions stored in one or more non-transitory, computer-readable storage devices or media.

As a part of a device, an apparatus, a system, and/or the like, a module may be coupled to or integrated with other parts of the device, apparatus, or system such that the combination thereof forms the device, apparatus, or system. Alternatively, the module may be implemented as a stand-alone device or apparatus.

Figure 3:
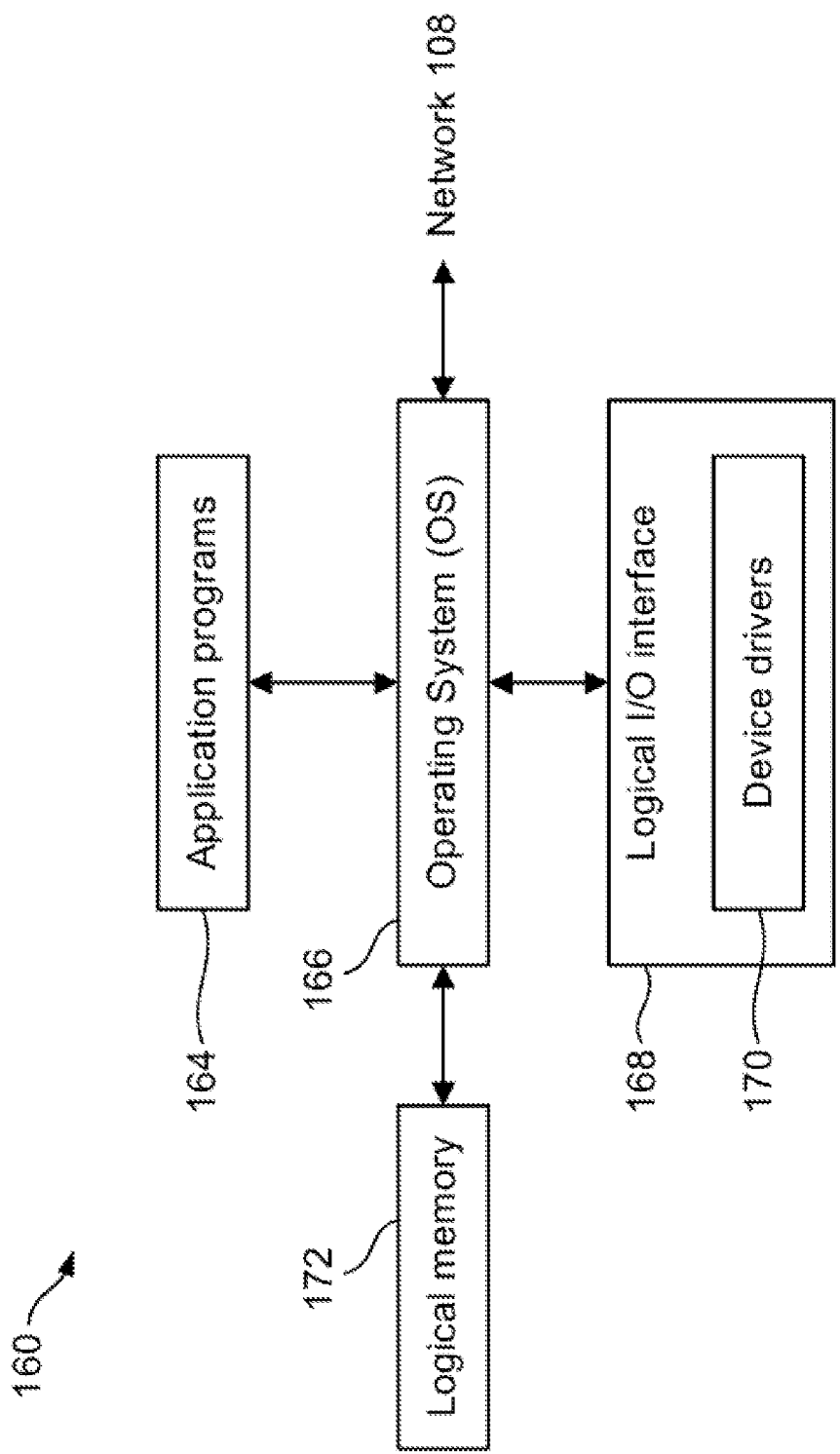
FIG. 3 is a schematic diagram showing a simplified software architecture of a computing device of the system shown in FIG. 1, according to an embodiment of the disclosure.

FIG. 3 shows a simplified software architecture 160 of server 102 or computing device 104. Software architecture 160 comprises one or more application programs 164, an operating system 166, a logical input/output (I/O) interface 168, and a logical memory 172. Application programs 164, operating system 166, and logical I/O interface 168 are generally implemented as computer-executable instructions or code in the form of software programs or firmware programs stored in logical memory 172 which may be executed by processing structure 122.

Herein, a software or firmware program is a set of computer-executable instructions or code stored in one or more non-transitory computer-readable storage devices or media such as memory 126, and may be read and executed by processing structure 122 and/or other suitable components of server 102 and/or computing devices 104 for performing one or more processes. Those skilled in the art will appreciate that a program may be implemented as either software or firmware, depending on the implementation purposes and requirements. Therefore, for ease of description, the terms "software" and "firmware" may be interchangeably used hereinafter.

Herein, a process has a general meaning equivalent to that of a method, and does not necessarily correspond to the concept of a computing process (which is the instance of a computer program being executed). More specifically, a process herein is a defined method implemented as software or firmware programs executable by hardware components for processing data (such as data received from users, other computing devices, other components of server 102 and/or computing devices 104, and/or the like). A process may comprise or use one or more functions for processing data as designed. Herein, a function is a defined sub-process or sub-method for computing, calculating, or otherwise processing input data in a defined manner and generating or otherwise producing output data.

Alternatively, a process may be implemented as one or more hardware structures having necessary electrical and/or optical components, circuits, logic gates, integrated circuit (IC) chips, and/or the like.

Referring back to FIG. 3, one or more application programs 164 are executed by or run by processing structure 122 for performing various tasks.

Operating system 166 manages various hardware components of server 102 or computing device 104 via logical I/O interface 168, manages logical memory 172, and manages and supports application programs 164. Operating system 166 is also in communication with other computing devices (not shown) via network 108 to allow application programs 164 to communicate with those running on other computing devices. As those skilled in the art will appreciate, operating system 166 may be any suitable operating system such as MICROSOFT® WINDOWS® (MICROSOFT and WINDOWS are registered trademarks of the Microsoft Corp., Redmond, WA, USA), APPLE® OS X, APPLE® iOS (APPLE is a registered trademark of Apple Inc., Cupertino, CA, USA), Linux, ANDROID® (ANDROID is a registered trademark of Google LLC, Mountain View, CA, USA), or the like. Server 102 and computing devices 104 of the system 100 may all have the same operating system, or may have different operating systems.

Logical I/O interface 168 comprises one or more device drivers 170 for communicating with respective input and output interfaces 130 and 132 for receiving data therefrom and sending data thereto. Received data may be sent to application programs 164 for being processed by application programs 164. Data generated by application programs 164 may be sent to logical I/O interface 168 for outputting to various output devices (via output interface 132).

Logical memory 172 is a logical mapping of physical memory 126 for facilitating application programs 164 to access. In this embodiment, logical memory 172 comprises a storage memory area that may be mapped to a non-volatile physical memory such as hard disks, solid-state disks, flash drives, and the like, generally for long-term data storage therein. Logical memory 172 also comprises a working memory area that is generally mapped to high-speed, and in some implementations, volatile physical memory such as RAM, generally for application programs 164 to temporarily store data during program execution. For example, an application program 164 may load data from the storage memory area into the working memory area, and may store data generated during its execution into the working memory area. Application program 164 may also store some data into the storage memory area as required or in response to a user's command.

In server computer 102, application programs 164 generally provide server functions for managing network communication with client computing devices 104 and facilitating collaboration between the server computer 102 and client computing devices 104. Herein, the term "server" may refer to a server computer 102 from a hardware point of view or a logical server from a software point of view, depending on the context.

As described above, processing structure 122 is usually of no use without meaningful firmware and/or software. Similarly, while a computer system such as system 100 may have the potential to perform various tasks, it cannot perform any tasks and is of no use without meaningful firmware and/or software. As will be described in more detail later, system 100 described herein, as a combination of hardware and software, generally produces tangible results tied to the physical world, wherein the tangible results such as those described herein may lead to improvements to the computer and system themselves.

There will now be described methods of organizing an online meeting, such as a teleconference using the computer network system 100, in accordance with embodiments of the disclosure. While these embodiments are described in the context of organizing a teleconference, it shall be understood that the disclosure is not limited to teleconferences and extends to any other suitable online meetings. In this context, "online" may refer to a state in which server 102 and client computing devices 104 are communicatively coupled to one another via network 108 such that data may be communicated between client computing devices 104, via network 108.

In these embodiments, each client computing device 104 is used by a user for joining an online meeting (or simply a "meeting"). The client computing devices 104 in a same meeting are denoted a "group" of the meeting hereinafter, and a client computing device 104 in a meeting is denoted a "member" of the meeting hereinafter (although the user of the client computing device 104 is the actual member of the meeting). Those skilled in the art will appreciate that some actions performed by a member, such as the creator (which may be a first-joined member (that is, the first member that has joined the online meeting before other members) or a convener; described in more detail later) approving another member to join the meeting, may be performed by the member under its user's instruction while some other actions performed by a member, such as updating the group tree) may be automatically performed by the client computing device as the member.

Secure online meetings using the computer network system 100 generally require secure network communications between client computing devices 104 using suitable technologies such as end-to-end encryption (E2EE). As described above, MLS may be used for providing E2EE.

As explained above, embodiments of the disclosure allow for the improved organization of online meetings without suffering from the limitations of MLS. As now described in further detail below, according to some embodiments, a meeting group is created gradually, with one member being added at a time and that member's path being updated by the group creator (who is also a member of the meeting group), so as not to overwhelm the network with multiple concurrent updates to the group tree. More generally, n members may be added to the group at a time, where n (n>0 being an integer) is configurable and may be based, for example, on the total expected group size. According to some embodiments, a rejoining member (i.e. a member that was previously in the online meeting and subsequently was disconnected from the online meeting) is permitted to immediately participate in the online meeting after rejoining the group. According to some embodiments, group key switching is performed once all online members have confirmed that they are able to derive the latest group key.

Figure 6:
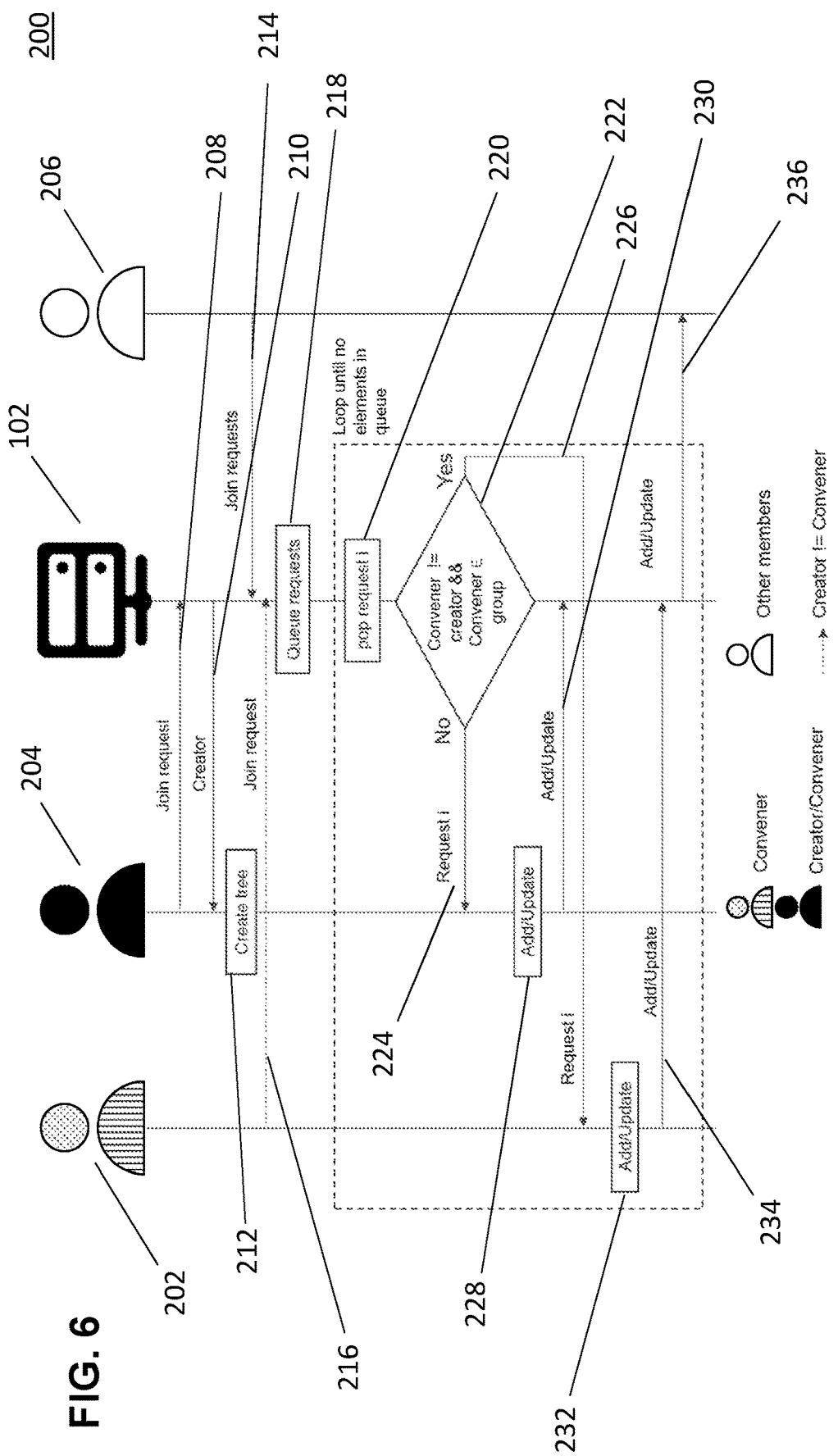
FIG. 6 is a flow diagram of a method of organizing a scheduled online meeting, according to an embodiment of the disclosure.

FIG. 6 illustrates a method 200 of organizing a scheduled online meeting, according to an embodiment of the disclosure, which is performed by the server computer 102 after, for example, a user (the meeting host or the "convener") sends a meeting invitation to one or more other users to invite them to a scheduled online meeting. According to this embodiment, in order for members to join the online meeting, server 102 generates a meeting identifier and embeds the meeting identifier into two links: a first link for the host or convener, and a second link for all other members of the group. Server 102 then sends the first link to the convener's client computing device and sends the second link to other members' client computing devices to allow the members (that is, convener and other members) to access and join the online meeting. When activated, each link generates a JOIN request that contains a data structure that may be referred to as a key package. As described in further detail below the key package contains information allowing the addition of the associated member to the online meeting.

According to this embodiment, the online meeting may commence even if the convener has not yet joined the online meeting. As will be described in further detail, this is achieved by assigning a creator role to a member (hereinafter, the "creator") that has already joined the online meeting. In particular, server 102 selects the first-joined member to be the creator. The creator has the responsibility of adding new members to the online meeting (for example, updating the group tree) in response to JOIN requests. If the convener is not the first member to join the online meeting then, once the convener joins the online meeting, responsibility for adding new members to the online meeting (for example, updating the group tree) is transferred from the creator to the convener, with the convener becoming the new creator and the first-joined member becoming a "normal" member. The convener also has the ability to call members directly so as to add them to the meeting, remove members from the meeting, and end the meeting.

Turning to FIG. 6, the process of organizing the scheduled online meeting will now be described.

At block 208, a member 204 of the group of members transmits a JOIN request to server 102 by activating (for example, clicking on) the link they were provided with by server 102. The member 204 (who may be the convener 202, or (as in the example shown in FIG. 6) may be another member of the group) is the first member of the group transmitted the JOIN request.

Server 102 receives the JOIN request from the member 204 and retrieves the key package from the JOIN request, determines the member 204's identity information (for example, whether or not the member is the convener 202), and stores the key package and/or the identity information of the member 204. As the member 204 is the first member of the group transmitted the JOIN request, server 102 assigns the member 204 as the creator (block 210). The online meeting is then created for the group. The member 204 becomes the first-joined member of the meeting and acts as the creator to allow other members to join the meeting.

At block 212, the first-joined member 204 (as the creator) generates the group tree that will be used to propagate updates to the group key as membership in the online meeting increases. In particular, referring to the example group tree shown in FIG. 4, if leaf node A corresponds to the physical node associated with the first-joined member 204, then the first-joined member 204 generates the group tree by generating leaf node A.

Server 102 may receive JOIN requests from other normal members 206 (block 214) and, from convener 202 (block 216) who have yet to join the online meeting. At block 218, server 102 queues the JOIN requests from normal members 206 and convener 202 (and any other JOIN requests received from other members of the group). Whenever a new JOIN request is received at server 102, server 102 adds the JOIN request to the queue. In the meantime, server 102 performs the following operations in a loop, until the queue of JOIN requests is exhausted.

At block 220, server 102 selects a JOIN request from the queue, retrieves the key package from the selected JOIN request, and determines the identity information of the sender (who is member to join the meeting) of the JOIN request (for example, whether or not the sender is the convener 202). At block 222, server 102 checks if the convener 202 has joined the meeting and if the creator (that is, the first-joined member 204) is the convener (block 222).

If server 102 determines that the convener 202 has not joined the meeting, at block 224, sever 102 then sends the JOIN request to the first-joined member 204 (who is acting as the creator) for the first-joined member 204 to add the sender of the JOIN request to the meeting (thus, the convener 202 has to be added to the meeting by the first-joined member 204 (as the creator) to join the meeting). The first-joined member 204 may add the sender of the JOIN request to the meeting by responding sever 102 with an add/update operation request (block 230; described in more detail later). Of course, the first-joined member 204 may alternatively reject the sender of the JOIN request if the JOIN request is not valid.

If server 102 determines that the convener 202 is not the creator and the convener 202 has joined the meeting, server 102 then assigns the creator role to convener 202 (and then the first-joined member 204 becomes a normal member) and sends the JOIN request to the convener/creator 202 for the convener 202 to add the sender of the JOIN request to the meeting (block 226). Convener 202 may add the sender of the JOIN request to the meeting by responding sever 102 with an add/update operation request (block 234; described in more detail later). Of course, the convener 202 may alternatively reject the sender of the JOIN request if the JOIN request is not valid.

Subsequent JOIN requests will be forwarded to convener 202 (assuming that convener 202 is still in the meeting) instead of member 204.

If, within a predetermined amount of time, the creator (being the first-joined member 204 or the convener 202) does not respond to a JOIN request forwarded by server 102 (for example if the creator/convener is currently disconnected from the online meeting), then server 102 selects another member currently in the online meeting and forwards the JOIN request to the selected member to allow the selected member to take over responsibility of adding new members to the online meeting (for example, updating the group tree). When the convener is reconnected to the online meeting, server 102 again assigns the creator role to convener 202 (and then the selected member becomes a normal member) and sends JOIN requests to the convener 202.

In the meantime, while server 102 processes the queued JOIN requests, at block 228, creator (being the first-joined member 204 or the convener 202) uses the JOIN request to add to the group tree the member associated with the JOIN request. For example, with reference to FIG. 4, if the member whose JOIN request is being processed by creator 202 or 204 corresponds to member F, then creator 202 or 204 adds leaf node F to the group tree, as well as adding logical node I connected to logical node K (the root node) and leaf nodes E and F.

Creator (being the first-joined member 204 or the convener 202) then updates, within the group tree, the path of the new member F. In particular, creator (being the first-joined member 204 or the convener 202) updates the secret keys stored at each logical node on a direct path extending from leaf node F to root node K. These updated secret keys are then sent to other members in the online meeting, in accordance with the MLS protocol. In MLS, the secret key of node I would be sent only to node E. However, according to the present embodiment, the secret key of node I is also sent to node F to allow client F to derive the other secret keys along the direct path from node F to root node K, and hence derive the group key. By having creator (being the first-joined member 204 or the convener 202) update the path of the new member F, as opposed to the new member F update their own path, the problem of new members attempting to update their respective paths at the same time may be addressed.

In more detail (and with reference to FIG. 4), the following steps are performed (not necessarily in the order shown) in order to add new member F to the group tree and update the group tree:

Member F requests from server 102 that they join the online meeting, by transmitting to server 102 a JOIN request. The JOIN request contains member F's key package.

Creator A creates a group tree T' that is copy of the current group tree T.

Creator A updates tree T' by creating logical node I, designating logical node K as the parent node of node I, designates node I as the parent node of leaf node E, adds new leaf node F, and designates logical node I as the parent node of leaf node F.

Creator A generates a random secret key $s_i$ at node I.

Creator A generates a secret key $s_k$ at node K by hashing $s_i$ (for example, by performing a hash key derivation function on $s_i$).

Creator A encrypts $s_i$ using the public key stored at node F.

Creator A encrypts $s_i$ using the public key stored at node E.

Creator A deletes $s_i$.

Creator A encrypts $s_k$ using the public key stored at node J. Since creator A needs to know $s_k$ in order to derive the group key, creator A does not delete $s_k$.

At block 230, creator (being the first-joined member 204 or the convener 202) sends an add/update operation to server 102. Server 102 then forwards the add/update operation to all members in the online meeting.

Once convener 202 has joined the online meeting and has been assigned the creator role by server 102, convener 202 processes JOIN requests that are forwarded by server 102 and updates the group tree on behalf of new members that join the online meeting.

For example, as can be seen in FIG. 6, at block 232 and in response to receiving a JOIN request from server 102, convener 202 adds the associated new member to the group tree and updates the group tree by updating the path of the new member, as described above. At block 234, convener 202 sends an add/update operation to server 102. At block 236, server 102 then forwards the add/update operation to all members in the online meeting. Whenever a member receives from server 102 an add/update operation, the member updates their version of the group tree based on the data contained in the add/update operation. In addition, the new member uses the sent information to build its version of the most current group tree.

In more detail, the following steps are performed (not necessarily in the order shown) in order to generate and propagate an add/update operation to all members in the online meeting. The following steps are described in the context of the above example, in which creator A added new member F and updated the group tree based on the addition of new member F.

Creator A constructs an add operation which includes an indication of new leaf node F and member F's key package (contained in the JOIN request).

Creator A creates an update operation which includes both versions of encrypted $s_i$ as well as encrypted $s_k$. In addition, the update operation contains the public keys of nodes I and K that are derived from $s_i$ and $s_k$, respectively. Moreover, the updated group tree with all public keys stored at the logical nodes and key packages stored at the leaf nodes is sent to the new member.

Creator A sends the add/update operation to server 102. Server 102 forwards the add/update operation to all members in the online meeting.

Once creator A receives the add/update operation (indicating that the add/update operation has been accepted by server 102), creator A updates their version of the group tree from T to T'.

Members B, C, D, and E apply the add operation to add member to F to their respective group trees. Member F builds a new state containing the received group tree T'.

Members B, C, D, E, and F decrypt encrypted $s_i$ and $s_k$ and use them to derive other secrets in the group tree as follows:

Member F decrypts the encrypted uses $s_i$ to derive $s_k$, and then uses $s_i$ and $s_k$ to derive private and public keys for nodes I and K, respectively.

Member E decrypts the encrypted uses $s_i$ to derive $s_k$, and then uses $s_i$ and $s_k$ to derive private and public keys for nodes I and K, respectively.

Members B, C, and D decrypt the encrypted $s_k$ and then uses $s_k$ to derive the private and public key pairs for node K.

All members in the online meeting now know $s_k$ and, using it, are able to derive the group key.

Figure 7:
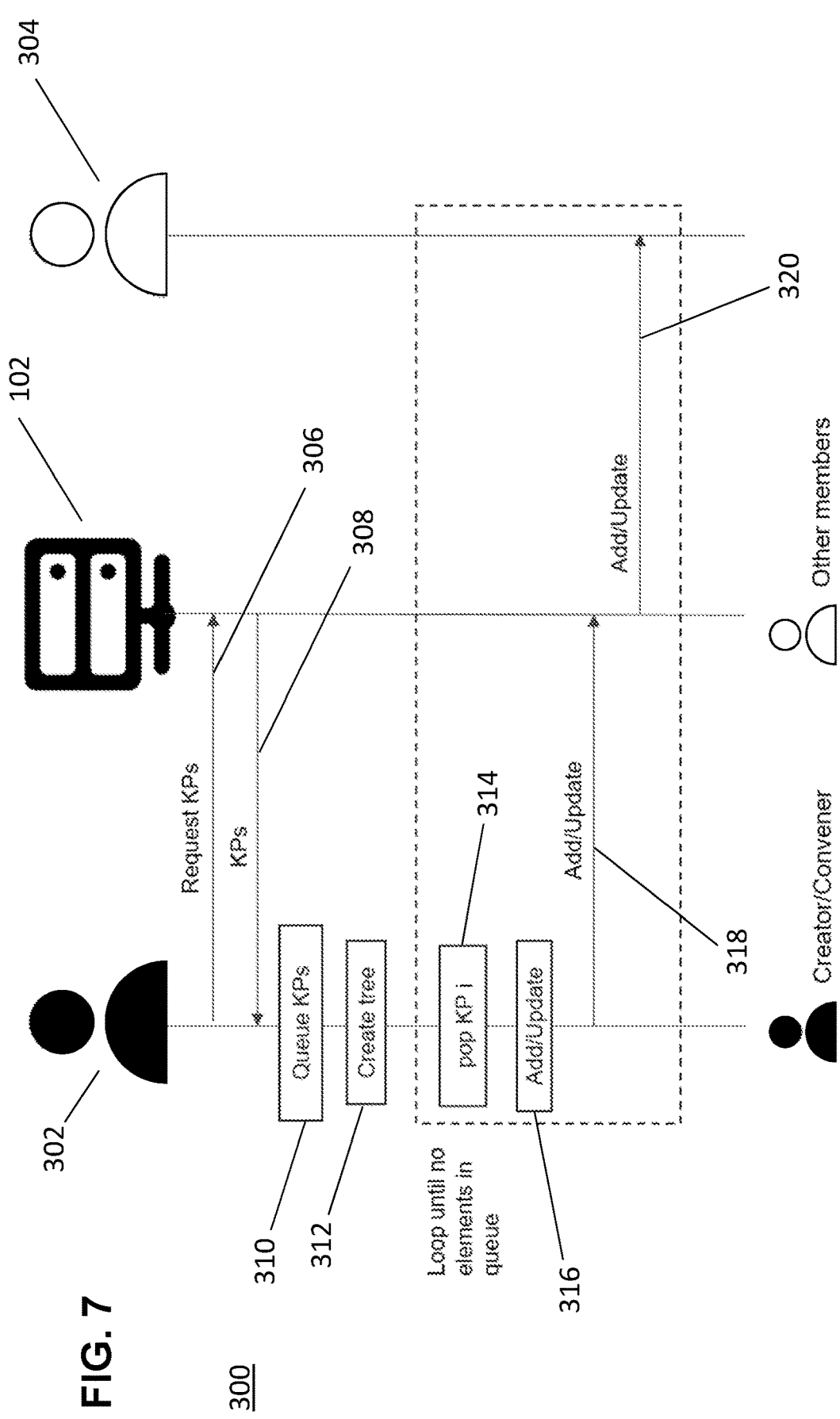
FIG. 7 is a flow diagram of a method of organizing a non-scheduled online meeting, according to an embodiment of the disclosure.

According to another embodiment, instead of a meeting being scheduled as in the case of FIG. 6, the convener may initiate the meeting by transmitting INVITATION requests to all members of the group (for example, the convener may initiate a "direct call" with all members of the group). According to this embodiment, an example of which is shown in FIG. 7, instead of the server forwarding the JOIN requests to the creator/convener, the convener may, prior to the online meeting, queries the server and receives from the sever all key packages of all members that will take part in the online meeting. FIG. 7 shows the operations performed during a direct call in order for the convener to add joining members to the online meeting, and in order for the convener to update the group tree.

According to this method 300 of organizing an online meeting, at block 306, the convener 302 queries the server 102 the key packages associated with all other members of the group. At block 308, server 102 sends the queried key packages to convener 302. At block 310, convener 302 queues the key packages.

At block 312, convener 302 generates the group tree that will be used to propagate updates to the group key as membership in the online meeting increases. In particular, referring to the example group tree shown in FIG. 4, if leaf node A corresponds to the physical node associated convener 302, then convener 302 generates the group tree by generating leaf node A. Convener 302 then performs the following operations in a loop, until the queue of the key packages is exhausted.

At block 314, convener 302 pops a key package from the queue. Based on the key package, convener 302 adds to the group tree the member associated with the key package. For example, with reference to FIG. 4, if the member's key package is being processed by convener 302 corresponds to member F, then convener 302 adds leaf node F to the group tree, as well as adding logical node I connected to logical node K (the root node) and leaf nodes E and F.

At block 316, convener 302 then updates, within the group tree, the path of the new member F. In particular, convener 302 updates the secret keys stored at each logical node on a direct path extending from leaf node F to root node K. These updated secret keys are then sent to other members in the online meeting, in accordance with the MLS protocol. In addition, the secret key of node I is also sent to node F to allow client F to derive the other secret keys along the direct path from node F to root node K, and hence derive the group key.

At block 318, convener 302 sends an add/update operation to server 102. Server 102 then forwards the add/update operation to all members in the online meeting. Whenever a member receives from server 102 an add/update operation, the member updates their version of the group tree based on the data contained in the add/update operation. In addition, the new member uses the sent information to build their version of the most current group tree.

The method of updating a member's group tree is similar to the method of updating a member's group tree described above in connection with FIG. 6.

As can be seen from the above descriptions of FIGS. 6 and 7, in response to new members joining the online meeting, the group tree is updated gradually by the creator/convener and on behalf of the newly joining members. The newly joining members therefore do not need to update their own group trees (for example, update their own group tree paths) at the join time, thereby reducing the burden on the network.

In certain cases, a member in the online meeting may temporarily leave the online meeting, for example due to connection issues. In order to rejoin the meeting, the member may transmit another JOIN request to the server, for example by re-activating the link that they were provided with. Depending on the amount of time that the member has been disconnected from the online meeting, upon rejoining the online meeting, the member may not be able to derive the most current group key. In particular, since the member has been disconnected from the online meeting, other members may have joined the online meeting and/or members may have been removed from the online meeting. In such cases, the group tree will have been updated, and as a result the member rejoining the meeting will be unable to derive the most current group key. Even if the membership of the online meeting has not changed since the rejoining member has been disconnected from the online meeting, the group key may have nevertheless been updated, for example as a result of a periodic update.

According to embodiments of the disclosure, and upon rejoining the online meeting, a rejoining member may immediately communicate with other members in the online meeting, while simultaneously applying any updates to the group tree that the rejoining member may not have had access to while disconnected from the meeting.

Figure 8:
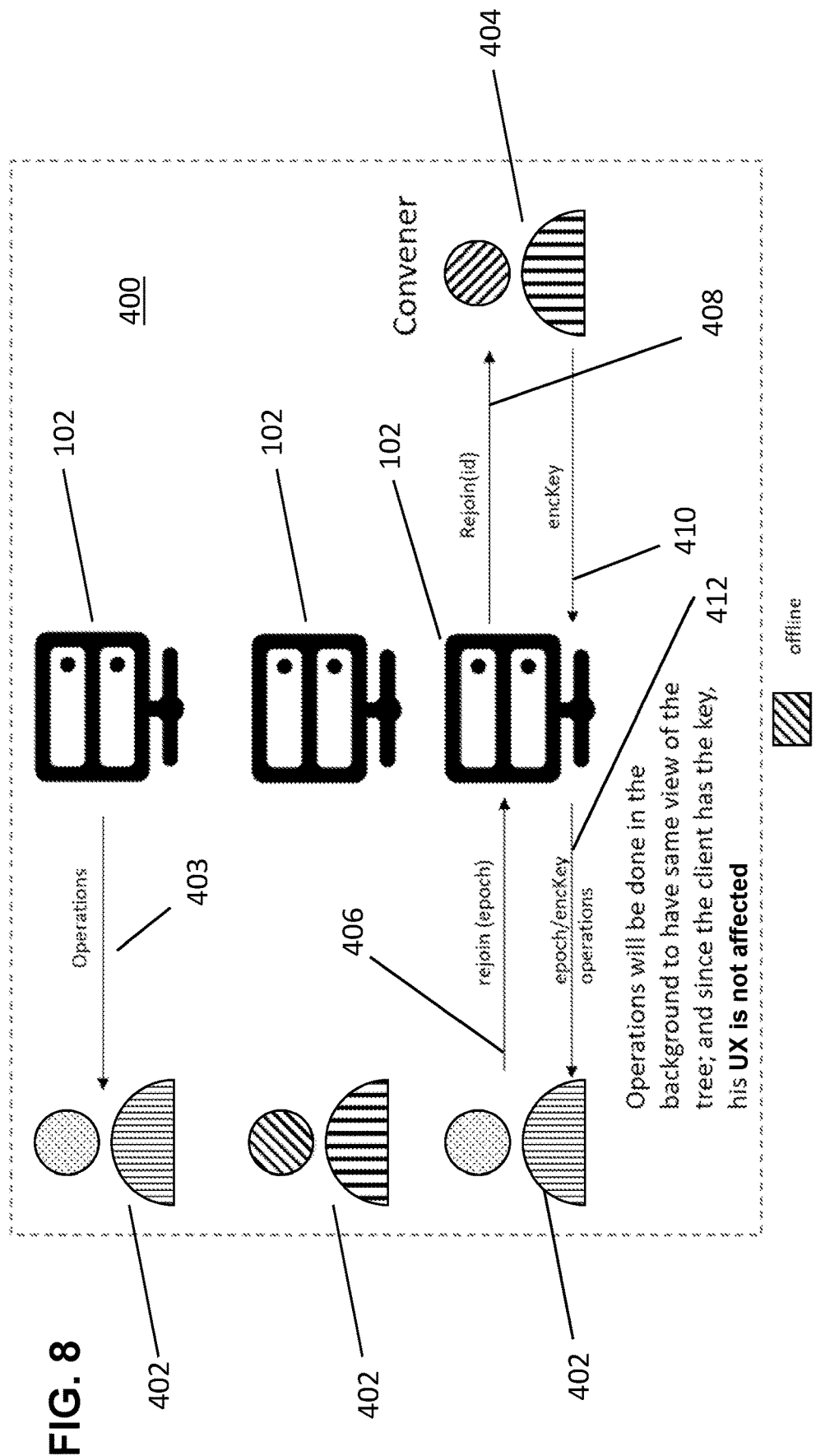
FIG. 8 is a flow diagram of a method of rejoining an online meeting, according to an embodiment of the disclosure.

In particular, referring now to FIG. 8, there is shown a method 400 of reconnecting to an online meeting, according to embodiments of the disclosure. As can be seen in FIG. 8, a member 402 receives operations (such as add, update, and remove operations 403) from server 102 while member 402 is in the online meeting. Subsequently, member 402 is disconnected from the online meeting and ceases to receive operations 403 from server 102.

In order to rejoin the meeting, member 402 transmits a REJOIN request 406 to server 102. REJOIN request 406 includes an indication of member 402's last epoch of the online meeting. An epoch identifies a certain period of time associated with a given group key during the online meeting. The epoch is incremented every time the group key is updated, for example as a result of a member being added to the online meeting, a member being removed from the online meeting, or the group key otherwise being updated.

Server 102 determines whether the current epoch of the online meeting matches the epoch identified in the REJOIN request. If the current epoch of the online meeting matches the epoch identified in the REJOIN request, then server 102 notifies member 402 that member 402 may use their current group key, since the group key will not have been updated since member 402 was disconnected from the online meeting.

If the current epoch of the online meeting does not match the epoch identified in the REJOIN request, then server 102 forwards the REJOIN request to the convener 404 (or, if the convener has not yet joined the online meeting, the creator). Convener 404 encrypts the current group key using the public key contained in the key package stored at the leaf node corresponding to member 402. Convener 404 then transmits the encrypted group key to server 102, and server 102 then forwards the encrypted group key to member 402 together with a list of any updates to the group tree that have been received by server 102 during the online meeting (i.e. all updates sent to server 102 by the creator and/or the convener) and while member 402 was disconnected from the online meeting (i.e. since the last epoch).

After receiving the encrypted group key, member 402 decrypts the encrypted group key using the private key corresponding to the public key used to encrypt the group key. By decrypting the encrypted group key, member 402 may begin communicating with other members in the online meeting (for example, receiving video streams, sending and receiving messages to other members in the online meeting) even though will not have the most up-to-date version of the group tree. As a result, any negative impacts to the user experience of member 402 due to their disconnection will be mitigated. In the meantime, member 402 applies the updates to the group tree that member 402 has received from server 102, in order to generate the most up-to-date version of the group tree.

As described above, since the group tree is gradually built up as and when new members of the group join the online meeting, with large groups there exists the propensity for many updates to the group tree (and, consequently, many updates to the group key) as the group tree is built up. With a large number of updates to the group key (hereinafter, "group key switches"), there is the potential for interruptions to the online meeting when switching from one group key to another group key. Embodiments of the disclosure may mitigate the effect of such occurrences, by periodically performing group key switches after a certain number of update operations have been received by server 102 and acknowledged by all online members of the group, as now described in further detail.

Figure 9:
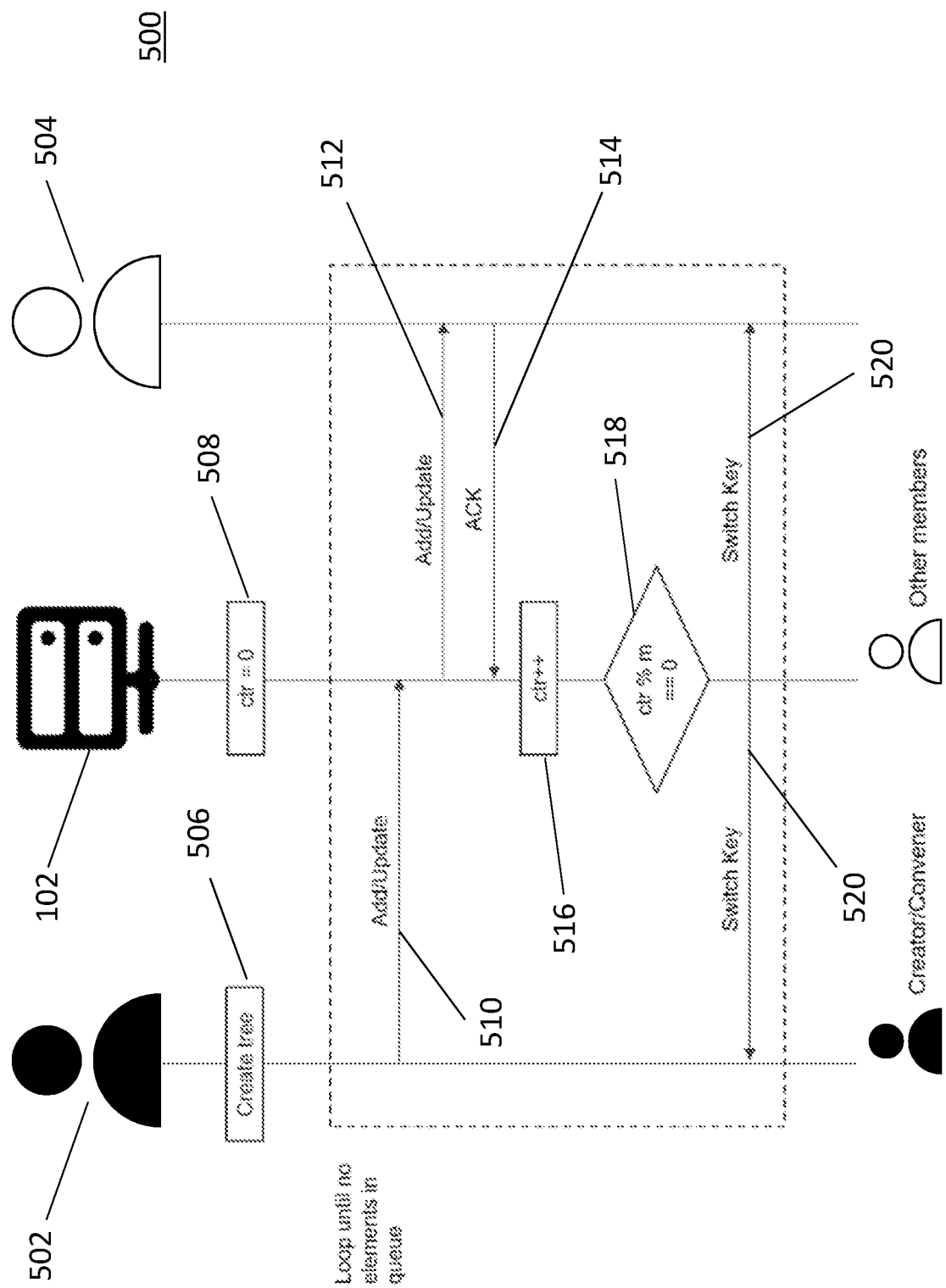
FIG. 9 is a flow diagram of a method of performing a group key switch, according to an embodiment of the disclosure.

In particular, and with reference to FIG. 9, there is now described a method 500 of performing a group key switch, according to an embodiment of the disclosure.

At block 506, the creator/convener 502 generates the group tree as described above. At block 508, server 102 initiates a counter. At block 510, after updating the group tree (for example, in response to a new member joining the online meeting), creator/convener 502 transmits the add/update operation (i.e. transmits the updated group tree and associated encrypted secret keys) to server 102. At block 512, server 102 forwards the add/update operation to each member in the online meeting. In response to receiving the add/update operation, at block 514, each member transmits an acknowledgement ("ACK") to server 102. At block 516, once server 102 has received from each member an ACK message confirming that the member has received the add/update operation, server 102 increments the counter.

At block 518, server 102 compares the counter to a threshold. In response to the value of the counter meeting the threshold, at block 520, server 102 notifies all members in the online meeting to perform a group key switch. In other words, server 102 notifies all members in the online meeting to use the latest version of their respective group trees in order to derive the group key. Blocks 510-520 are looped for every add/update operation that is sent from creator/convener 502 to server 102.

If a member joins the meeting immediately after a key switch, then that member will generate their own group key and therefore will not have access to the previous group key that is still in use by all other online members. Therefore, in such situations, the previous group key that is still in use by all other online members is encrypted by the creator (being the first-joined member 204 or the convener 202) and sent to the new member so that they may be able to communicate with all other online members. In particular, the current group key is encrypted using the public key stored at the leaf node corresponding to the new member, and sent to the new member.

While group key switching is performed during the addition of group members to the online meeting, it may also be performed periodically after every member has joined the online meeting. In addition, if members are removed from the online meeting, the group tree will need to be updated and, consequently, the group key updated as well. In such cases, server 102 ensures that all members still in the online meeting have acknowledged receipt of any update/remove operation, or simply an update operation, prior to server 102 notifying members to perform a group key switch. As a result, this may enable members that for any reason did not receive the current group update operation from communicating with other members in the online meeting.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A method of organizing an end-to-end encrypted online meeting for a group of members including a creator, comprising:
   maintaining, by each member in the online meeting including the creator, a group tree from which is derivable a group key required for communication between members in the online meeting;
   accessing, by the creator, a key package associated with a member of the group;
   adding to the online meeting, by the creator and based on the key package, the member associated with the key package;
   updating, by the creator, the group tree maintained by the creator;
   generating, by the creator and based on the updated group tree, one or more encrypted secret keys required for deriving the group key;
   transmitting, by the creator and via a server, the updated group tree and the one or more encrypted secret keys to each other member in the online meeting;
   receiving, by the server, a JOIN request from a member of the group wishing to join the online meeting;
   transmitting, by the server, the JOIN request to the creator;
   determining, by the server, that no response to the JOIN request has been received within a predetermined amount of time;
   in response to determining that no response to the JOIN request has been received within the predetermined amount of time:
      selecting, by the server, another member of the group that has joined the online meeting; and
      transmitting the JOIN request to the selected member of the group.

2. The method of claim 1, wherein the group tree comprises:
   a number of leaf nodes, each leaf node corresponding to a member of the group that has joined the online meeting; and a number of logical nodes including a root node, each logical node being connected to one or more of:
at least one leaf node; and
at least one other logical node.

3. The method of claim 2, wherein said updating the group tree comprises:
adding a leaf node to the group tree, wherein the leaf node corresponds to the member of the group associated with the key package; and
adding a logical node to the group tree.

4. The method of claim 3, wherein said generating the one or more encrypted secret keys comprises:
randomly generating a secret key at the added logical node;
for each logical node on a direct path extending from the added logical node to the root node, except for the added logical node:
deriving a secret key based on the secret key stored at a child node of the logical node; and
encrypting the derived secret key using a public key stored at another child node of the logical node.

5. The method of claim 1, wherein said accessing the key package comprises:
receiving, by the creator, a JOIN request associated with member of the group wishing to join the online meeting; and
extracting, by the creator, the key package from the JOIN request.

6. The method of claim 1 further comprising:
prior to the creator joining the online meeting, requesting, by the creator and from the server, a key package associated with each other member of the group; and
receiving each requested key package.

7. The method of claim 1, wherein the group of members further includes a convener, and wherein the method further comprises:
receiving, by the server and from the convener, a request to join the online meeting;
permitting, by the server and based on the request, the convener to join the online meeting; and
assigning, by the server, a creator role to the convener.

8. The method of claim 1 further comprising:
receiving, by the server and from a member of the group that had previously joined the online meeting and that is currently not in the online meeting, a request to rejoin the online meeting; and
determining, by the server and based on the request to rejoin the online meeting, whether to provide the member requesting to rejoin the online meeting with any updates to the group tree and any encrypted secret keys generated while the member requesting to rejoin the online meeting was not in the online meeting.

9. The method of claim 8, wherein said determining whether to provide the member requesting to rejoin the online meeting with any updates to the group tree and any encrypted secret keys comprises:
determining an epoch associated with the request to rejoin the online meeting; and
determining, based on the epoch, whether to provide the member requesting to rejoin the online meeting with any updates to the group tree and any encrypted secret keys.

10. The method of claim 9, wherein said determining whether to provide the member requesting to rejoin the online meeting with any updates to the group tree and any encrypted secret keys comprises:

determining that the epoch associated with the request to rejoin the online meeting does not correspond to a current epoch of the online meeting; and
in response thereto, providing the member requesting to rejoin the online meeting with any updates to the group tree and any encrypted secret keys generated while the member requesting to rejoin the online meeting was not in the online meeting.

11. The method of claim 10, wherein said providing the member requesting to rejoin the online meeting with any updates to the group tree and any encrypted secret keys comprises:
transmitting, by the server, the request to rejoin the online meeting to the creator;
after transmitting the request to rejoin the online meeting, receiving by the server and from the creator, the group key, wherein the group key is encrypted; and
transmitting, by the server and to the member requesting to rejoin the online meeting, the encrypted group key, any updates to the group tree, and any encrypted secret keys generated while the member requesting to rejoin the online meeting was not in the online meeting.

12. The method of claim 11, wherein the group key is encrypted using a public key stored at a leaf node of the group tree corresponding to the member requesting to rejoin the online meeting.

13. The method of claim 9, wherein said determining whether to provide the member requesting to rejoin the online meeting with any updates to the group tree and any encrypted secret keys comprises:
determining that the epoch associated with the request to rejoin the online meeting corresponds to a current epoch of the online meeting; and
in response thereto, notifying, by the server, the member requesting to rejoin the online meeting that the member requesting to rejoin the online meeting may use their current group key to communicate with other members in the online meeting.

14. The method of claim 1 further comprising:
incrementing, by the server, a counter for each update to the group tree maintained by the creator;
comparing, by the server, the counter to a threshold; and
based on the comparison, determining, by the server, whether to notify members in the online meeting to use the current group key to communicate with other members in the online meeting.

15. The method of claim 14, wherein said incrementing the counter comprises:
after transmitting the updated group tree and the one or more encrypted secret keys to each other member in the online meeting, determining, by the server, that each other member in the online meeting has acknowledged receipt of the updated group tree and the one or more encrypted secret keys; and
in response thereto, incrementing the counter.

16. The method of claim 1 further comprising:
after all members of the group have joined the online meeting, receiving a further updated group tree;
transmitting the further updated group tree to each member in the online meeting;
determining that each member in the online meeting has acknowledged receipt of the further updated group tree; and
in response thereto, notifying members in the online meeting to use the current group key to communicate with other members in the online meeting.

17. The method of claim 1, wherein the online meeting operates according to the Messaging Layer Security (MLS) protocol.

18. A non-transitory computer-readable medium having stored thereon computer program code configured, when executed by one or more processors, to cause the one or more processors to perform a method of organizing an end-to-end encrypted online meeting for a group of members including a creator, comprising:
  maintaining, by each member in the online meeting, including the creator, a group tree from which is derivable a group key required for communication between members in the online meeting;
  accessing, by the creator, a key package associated with a member of the group;
  adding to the online meeting, by the creator and based on the key package, the member associated with the key package;
  updating, by the creator, the group tree maintained by the creator;
  generating, by the creator and based on the updated group tree, one or more encrypted secret keys required for deriving the group key;
  transmitting, by the creator and via a server, the updated group tree and the one or more encrypted secret keys to each other member in the online meeting;
  receiving, by the server, a JOIN request from a member of the group wishing to join the online meeting;
  transmitting, by the server, the JOIN request to the creator;
  determining, by the server, that no response to the JOIN request has been received within a predetermined amount of time;
  in response to determining that no response to the JOIN request has been received within the predetermined amount of time:
    selecting, by the server, another member of the group that has joined the online meeting; and
    transmitting the JOIN request to the selected member of the group.

19. A computer processor connected to a non-transitory computer-readable medium storing instructions, wherein the computer processor is for executing the instructions to perform actions for organizing an end-to-end encrypted online meeting for a group of members including a creator, the actions comprising:
  maintaining, by each member in the online meeting, including the creator, a group tree from which is derivable a group key required for communication between members in the online meeting;
  accessing, by the creator, a key package associated with a member of the group;
  adding to the online meeting, by the creator and based on the key package, the member associated with the key package;
  updating, by the creator, the group tree maintained by the creator;
  generating, by the creator and based on the updated group tree, one or more encrypted secret keys required for deriving the group key;
  transmitting, by the creator and via a server, the updated group tree and the one or more encrypted secret keys to each other member in the online meeting;
  receiving, by the server, a JOIN request from a member of the group wishing to join the online meeting;
  transmitting, by the server, the JOIN request to the creator;
  determining, by the server, that no response to the JOIN request has been received within a predetermined amount of time;
  in response to determining that no response to the JOIN request has been received within the predetermined amount of time:
    selecting, by the server, another member of the group that has joined the online meeting; and
    transmitting the JOIN request to the selected member of the group.

20. A method of organizing an end-to-end encrypted online meeting for a group of members including a creator, comprising:
  maintaining, by each member in the online meeting including the creator, a group tree from which is derivable a group key required for communication between members in the online meeting;
  accessing, by the creator, a key package associated with a member of the group;
  adding to the online meeting, by the creator and based on the key package, the member associated with the key package;
  updating, by the creator, the group tree maintained by the creator;
  generating, by the creator and based on the updated group tree, one or more encrypted secret keys required for deriving the group key;
  transmitting, by the creator and via a server, the updated group tree and the one or more encrypted secret keys to each other member in the online meeting;
  receiving, by the server and from a member of the group that had previously joined the online meeting and that is currently not in the online meeting, a request to rejoin the online meeting; and
  determining, by the server and based on the request to rejoin the online meeting, whether to provide the member requesting to rejoin the online meeting with any updates to the group tree and any encrypted secret keys generated while the member requesting to rejoin the online meeting was not in the online meeting.

21. A method of organizing an end-to-end encrypted online meeting for a group of members including a creator, comprising:
  maintaining, by each member in the online meeting including the creator, a group tree from which is derivable a group key required for communication between members in the online meeting;
  accessing, by the creator, a key package associated with a member of the group;
  adding to the online meeting, by the creator and based on the key package, the member associated with the key package;
  updating, by the creator, the group tree maintained by the creator;
  generating, by the creator and based on the updated group tree, one or more encrypted secret keys required for deriving the group key;
  transmitting, by the creator and via a server, the updated group tree and the one or more encrypted secret keys to each other member in the online meeting;
  incrementing, by the server, a counter for each update to the group tree maintained by the creator;
  comparing, by the server, the counter to a threshold; and
  based on the comparison, determining, by the server, whether to notify members in the online meeting to use the current group key to communicate with other members in the online meeting.

22. A method of organizing an end-to-end encrypted online meeting for a group of members including a creator, comprising:
- maintaining, by each member in the online meeting including the creator, a group tree from which is derivable a group key required for communication between members in the online meeting;
- accessing, by the creator, a key package associated with a member of the group;
- adding to the online meeting, by the creator and based on the key package, the member associated with the key package;
- updating, by the creator, the group tree maintained by the creator;
- generating, by the creator and based on the updated group tree, one or more encrypted secret keys required for deriving the group key; and
- transmitting, by the creator and via a server, the updated group tree and the one or more encrypted secret keys to each other member in the online meeting, wherein the group tree comprises:
- a number of leaf nodes, each leaf node corresponding to a member of the group that has joined the online meeting; and
- a number of logical nodes including a root node, each logical node being connected to one or more of:
  - at least one leaf node; and
  - at least one other logical node, wherein said updating the group tree comprises:
- adding a leaf node to the group tree, wherein the leaf node corresponds to the member of the group associated with the key package; and
- adding a logical node to the group tree, and wherein said generating the one or more encrypted secret keys comprises:
- randomly generating a secret key at the added logical node;
- for each logical node on a direct path extending from the added logical node to the root node, except for the added logical node:
  - deriving a secret key based on the secret key stored at a child node of the logical node; and
  - encrypting the derived secret key using a public key stored at another child node of the logical node.

* * * * *